United States Patent
Balasubramanian

(10) Patent No.: US 8,605,626 B2
(45) Date of Patent: Dec. 10, 2013

(54) METHOD AND APPARATUS FOR PRESERVING EXTENSIONS IN MULTI-VENDOR TRILL NETWORKS

(75) Inventor: Hariharan Balasubramanian, Oak Park, CA (US)

(73) Assignee: Cisco Technology, Inc., Santa Clara, CA (US)

( * ) Notice: Subject to any disclaimer, the term of this patent is extended or adjusted under 35 U.S.C. 154(b) by 150 days.

(21) Appl. No.: 13/110,166

(22) Filed: May 18, 2011

(65) Prior Publication Data

US 2012/0294194 A1 Nov. 22, 2012

(51) Int. Cl.
  *H04L 12/44* (2006.01)
(52) U.S. Cl.
  USPC .......................................................... 370/256
(58) Field of Classification Search
  USPC ................................................ 370/254–340
  See application file for complete search history.

(56) References Cited

U.S. PATENT DOCUMENTS

| 7,944,860 | B2 * | 5/2011 | Rajagopalan et al. | 370/256 |
| 8,295,291 | B1 * | 10/2012 | Ramanathan et al. | 370/400 |
| 2010/0309820 | A1 * | 12/2010 | Rajagopalan et al. | 370/256 |

* cited by examiner

*Primary Examiner* — Ayaz Sheikh
*Assistant Examiner* — Debebe Asefa
(74) *Attorney, Agent, or Firm* — P. Su

(57) ABSTRACT

In one embodiment, a method includes identifying a current topology associated with a virtual local area network (VLAN) and determining whether the current topology of the VLAN is to be moved to a base topology associated with a Transparent Interconnection of Lots of Links (TRILL) protocol. The method also includes moving the current topology of the VLAN to the base topology if it is determined that the current topology of the VLAN is to be moved to the base topology.

19 Claims, 7 Drawing Sheets

METHOD AND APPARATUS FOR PRESERVING EXTENSIONS IN MULTI-VENDOR TRILL NETWORKS

BACKGROUND

1. Field of Disclosure

The disclosure relates generally to networks and, more specifically, to supporting different topologies in a Transparent Interconnection of Lots of Links (TRILL) network.

2. Description of Related Art

A Transparent Interconnection of Lots of Links (TRILL) protocol provides transparent forwarding by providing the benefits of Layer 3 on a Layer 2 network. The TRILL protocol is often used to effectively replace spanning tree as a mechanism by which to find loop free trees within Layer 2 broadcast domains.

Components in a TRILL network may be provided by different vendors that introduce vendor-specific extensions to the TRILL network. Components, e.g., switches, provided by one vendor may not be able to implement or process extensions associated with another vendor. As a component provided by one vendor may be unable to process vendor-specific extensions associated with another vendor, it is likely that in a mixed-vendor TRILL network, the benefits of vendor-specific extensions of different vendors may not be realized on an end-to-end basis. Vendor-specific extensions may be ignored by components in a mixed-vendor TRILL network and, therefore, the benefits of the extensions may not be realized. Significant issues may arise, however, when components from one vendor in a mixed-vendor TRILL network incorrectly process vendor-specific extensions associated with another vendor. Among issues that may arise are incorrect packet forwarding, packet drops, and loops occurring if vendor-specific extensions are incorrectly processed.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
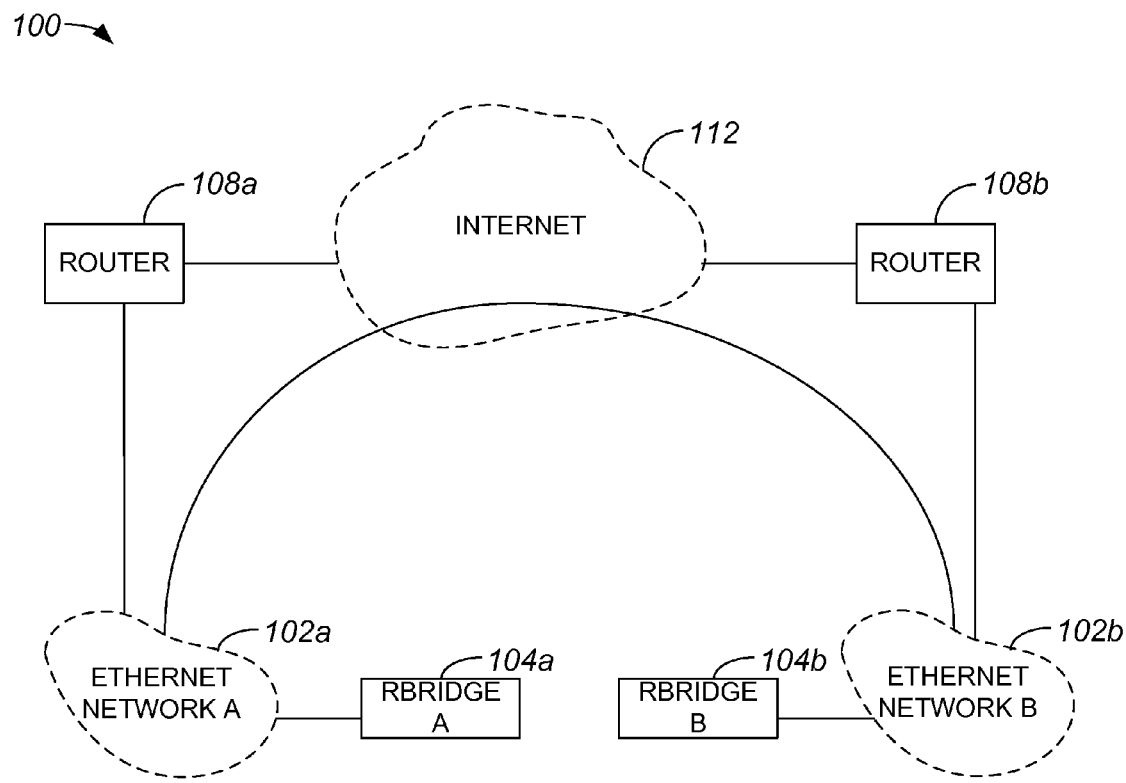
FIG. 1 is a diagrammatic representation of a Transparent Interconnection of Lots of Links (TRILL) network that includes rbridges.

According to one aspect, a method includes identifying a current topology associated with a virtual local area network (VLAN) and determining whether the current topology of the VLAN is to be moved to a base topology associated with a Transparent Interconnection of Lots of Links (TRILL) protocol. The method also includes moving the current topology of the VLAN to the base topology if it is determined that the current topology of the VLAN is to be moved to the base topology.

DESCRIPTION

A Transparent Interconnection of Lots of Links (TRILL) network is often a mixed-vendor network, as components in the TRILL network may be provided by different vendors. Such vendors may each provide vendor-specific extensions to TRILL that may not be processed by all components in the TRILL network. Extensions to TRILL may be achieved using a combination of extensions to TRILL headers in a dataplane, as well as extensions and changes to control plane processing. Because a component provided by a first vendor may not be able to process vendor-specific extensions of a second vendor, as for example because vendor-specific extensions are proprietary, it may not be possible to realize the benefits of the vendor-specific extensions of the second vendor on an end-to-end basis within a mixed-vendor network. Although vendor-specific extensions may be ignored by components, in some instances, vendor-specific extensions may be processed incorrectly by components that do not understand the vendor-specific extensions.

A routing bridge (rbridge) is a node or device, as for example a switch, within a network that implements a TRILL protocol. An rbridge incorporates both routing and bridging features with respect to the TRILL protocol, and forwards frames on link segments, e.g., Ethernet link segments. Frames which are obtained by an ingress rbridge of an rbridge campus are generally encapsulated and routed in encapsulated form through the rbridge campus until the frames reach an egress rbridge of the rbridge campus. The egress rbridge decapsulates the encapsulated frames, and forwards the frames as appropriate. When an ingress rbridge encapsulates a frame, the frame is typically encapsulated with a TRILL and Ethernet header.

In general, rbridges communicate with each other using an Intermediate System-Intermediate System (IS-IS) with extensions to establish shortest paths across a Layer 2 topology. As will be appreciated by those skilled in the art, substantially all rbridges in a network support a "standard," i.e., default or base, IS-IS topology that is defined as a Multi-Topology (MT) ID #0. In addition to participating in a standard IS-IS topology, many rbridges also participate in additional topologies. An rbridge that participates in an additional topology, e.g., a non-base or non-default topology such as MT ID #X, may be able to send associated traffic to and receive associated traffic from other rbridges that participate in MT ID #X.

A virtual local area network (VLAN) is a group of devices that communicate as if associated with a common broadcast domain, regardless of where the devices are physically located. Within an rbridge campus, VLANs and the priority of TRILL encapsulated frames is generally preserved. Typically, any given rbridge may be a part of more than one VLAN. Each rbridge lists the VLANs for which the rbridge is effectively appointed a forwarder on at least one port.

As mentioned above, vendor-specific extensions may be provided to TRILL. Such vendor-specific extensions may be used within a TRILL network to support a non-base topology. When substantially no vendor-specific extensions are provided to TRILL, a base or default topology is effectively supported. A VLAN may effectively belong to one topology. Thus, when a VLAN is placed in a non-base topology, the VLAN is no longer a part of a base topology. A VLAN is associated with a non-base topology, the VLAN may no longer communicate with nodes, e.g., switches, that support the base topology but not the non-base topology. That is, a VLAN associated with a non-base topology may communicate using standards associated with the non-base topology, but may not communicate using standards associated with a base topology.

In one embodiment, when it is desirable for a VLAN associated with a non-base topology to communicate using standards associated with a base topology, the VLAN may be moved or otherwise migrated from the non-base topology to the base topology. For example, if connectivity may be lost within a VLAN unless the VLAN is moved or migrated to a base topology, the VLAN may be moved to the base topology in a distributed manner. Connectivity within a VLAN associated with a non-base topology may be lost when an attempt to configure extensions, is unsuccessful, or when at least one rbridge in the VLAN that acts as a transit bridge is unable to support the non-base topology. By moving a VLAN associated with a non-base topology to a base topology, connectivity is preserved with respect to the VLAN.

In general, a determination of whether to move a VLAN to a base topology may occur at substantially any time. For instance, a determination of whether to move a VLAN to a base topology may occur when a network topology change is detected, or when an attempt to configure non-base extensions is identified.

Referring initially to FIG. 1, one example of a TRILL network that includes rbridges will be described. A TRILL network 100 includes a plurality of Ethernet networks 102a, 102b that are in communication with the Internet 112 through routers 108a, 108b. Routers 108a, 108b forward Internet Protocol (IP) packets from one Layer 2 broadcast domain to another based on Layer 3 addressing and forwarding information. Each Ethernet network 102a, 102b may have an associated switch 104a, 104b that effectively connects Ethernet networks 102a, 102b into a substantially single Layer 2 network. In one embodiment, switches 104a, 104b are rbridges. Such rbridges 104a, 104b may have at least one VLAN associated therewith.

Figure 2:
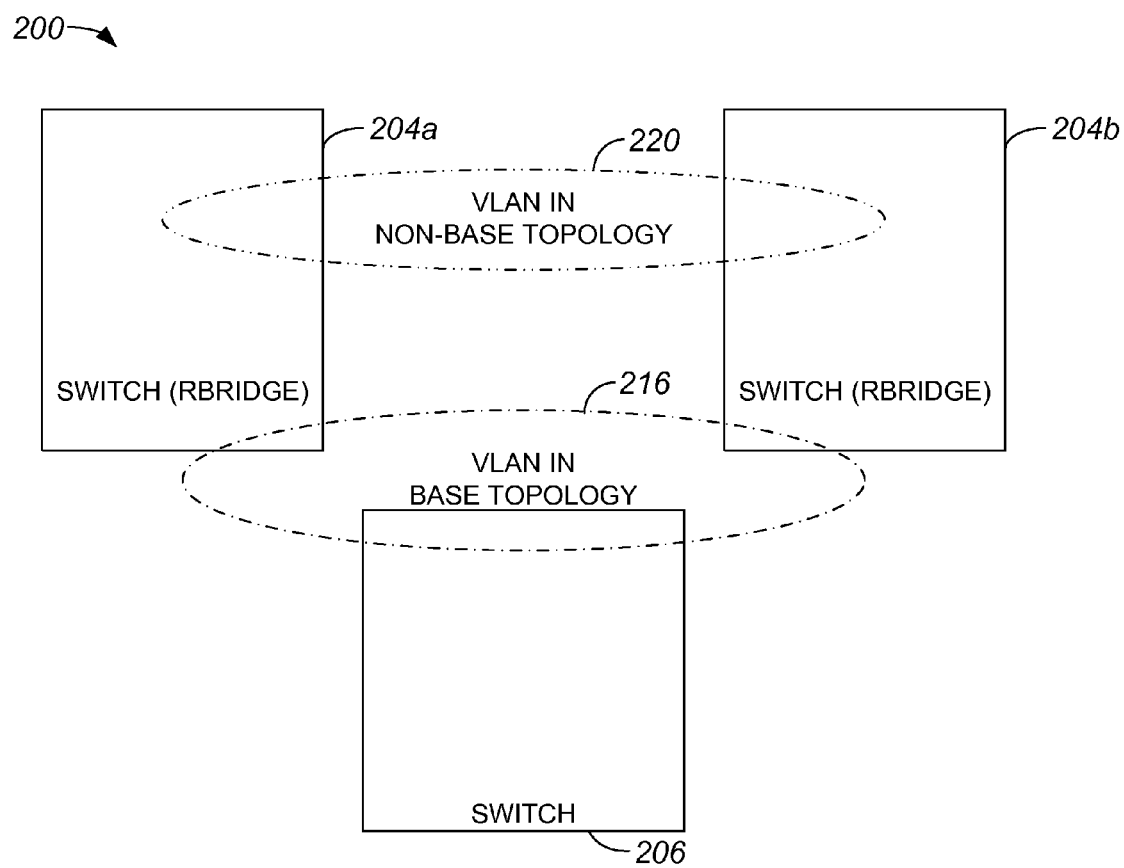
FIG. 2 is a diagrammatic representation of virtual local area networks (VLANs) associated with switches in accordance with an embodiment.

FIG. 2 is a diagrammatic representation of VLANs associated with switches in accordance with an embodiment. A network 200 may include a plurality of switches 204a, 204b, 206. Switches 204a, 204b may be rbridges and, in one embodiment, may have substantially the same configuration, e.g., may be provided by the same vendor. Switch 206, however, may have a different configuration than switches 204a, 204b. For example, switch 206 may have a different provider or vendor than switches 204a, 204b. In one embodiment, switch 206 may be an rbridge.

Each switch 204a, 204b, 206b may be associated with more than one VLAN 216, 220. Switches 204a, 204b may be part of a VLAN associated with a non-base topology 220, while switch 206 is not part of VLAN 220. Switches 204a, 204b, 206 are included in a VLAN associated with a base, or safe, topology 216. Although VLAN 220 is associated with a non-base topology, it should be appreciated that in one embodiment, if it is determined that VLAN 220 includes a node (not shown) which is not associated with the non-base topology, VLAN 220 may be substantially automatically placed in the base topology. By way of example, if it is determined that not all nodes associated with VLAN 220 are interested in frames associated with the non-base technology, to effectively ensure that there is no loss of connectivity within VLAN 220, VLAN 220 may be moved to the base topology.

Connectivity may be lost within a VLAN if there is an attempt to configure fabric-path specific or vendor specific extensions that are not supported by each node, e.g., switch or rbridge, within the VLAN. Connectivity may also be lost within a VLAN if a VLAN becomes isolated within an overall network. VLANS may become isolated within a network, as for example when rbridges associated with a first non-base topology are used as transit rbridges for a second non-base topology that is different from the first non-base topology. To reduce the likelihood of VLANs becoming isolated within a network due to the use of rbridges of a first non-base topology as transit bridges for a second non-base topology, VLANs may be moved to a base topology such that base connectivity is utilized, at the cost of losing specific extensions associated with the second non-base topology.

Figure 3:
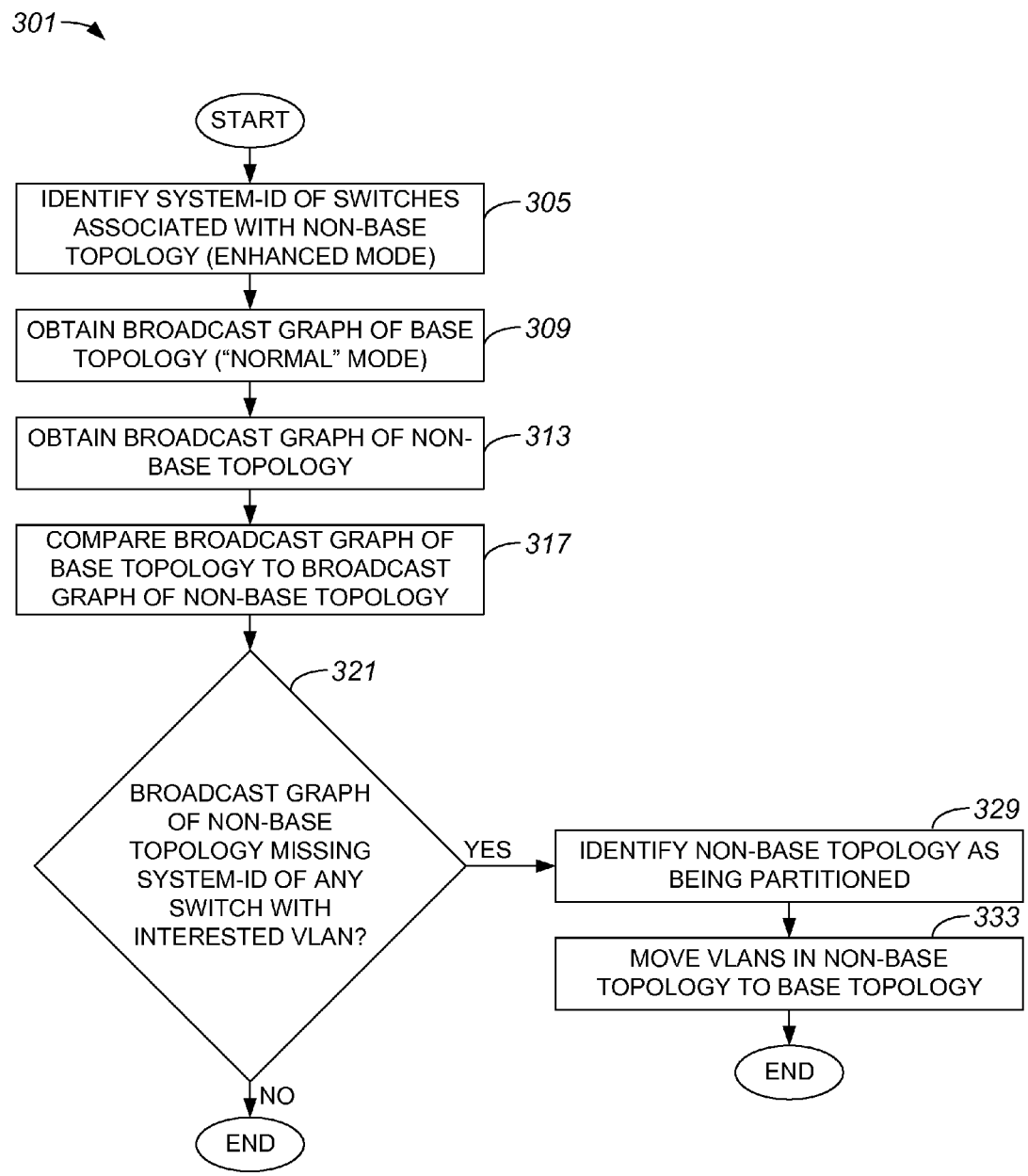
FIG. 3 is a process flow diagram which illustrates a method of processing a network topology change in accordance with an embodiment.

When a network topology change is detected, an rbridge may determine whether to preserve a specific extension in a frame, or whether to effectively drop the specific extension from the frame. FIG. 3 is a process flow diagram which illustrates a method of processing a network topology change in accordance with an embodiment. For ease of discussion, an rbridge that processes a network topology change is assumed to be associated with a VLAN that has a non-base topology. A method 301 of processing a network topology change begins at step 305 in which a system-ID of rbridges or, more generally, switches associated with a non-base topology, or an enhanced mode, are identified. In one embodiment, rbridges associated with a non-base topology are arranged to process frames that include extensions, e.g., fabric-path specific extensions.

After the system-ID of each rbridges associated with a non-base topology is identified, a broadcast graph associated with a base topology, e.g., a "normal" or default mode, is obtained in step 309. In one embodiment, a broadcast graph is a tree spanning substantially every rbridge that participates in a topology. For each topology, a root rbridge may be selected by substantially all rbridges that participate in that topology, and using the selected root rbridge, approximately every rbridge may independently compute a tree spanning approximately every other rbridge. As a result of common rules and shared information, the tree computed by each rbridge will effectively be the same for a given topology.

A broadcast graph associated with a non-base topology is obtained in step 313. After the broadcast graphs are obtained, the broadcast graph of the base topology and the broadcast graph of the non-base topology are compared in step 317.

A determination is made in step 321 as to whether the broadcast graph of the non-base topology is missing a system-ID of any rbridge with an interested VLAN in the non-base topology. A system-ID of an rbridge may be derived from a media access control (MAC) address of the rbridge. If it is determined that the broadcast graph of the non-base topology is not missing a system-ID of any rbridge with an interested VLAN in the non-base topology, then the method of processing a network topology change is completed.

Alternatively, if the determination in step 321 is that the broadcast graph of the non-base topology is missing a system-ID of any rbridge with an interested VLAN in the non-base topology, the non-base topology is identified as being partitioned in step 329. In one embodiment, when the non-base topology is identified as being partitioned with respect to VLANs that are in the non-base topology, the indication is that there is at least one rbridge associated with a particular vendor in the network, and that rbridge is in a transit path with at least one rbridge of another vendor. Thus, to repair a partition, a VLAN identified as being partitioned may be moved to a base topology.

From step 329, process flow moves to step 333 in which VLANs in the non-base topology are moved to the base topology. In one embodiment, substantially automatically moving VLANs in the non-base topology to the base topology effectively restores connectivity at the expense of enhanced features, e.g., extensions associated with a particular vendor. Once VLANs in the non-base topology are moved to the base topology, the method of processing a network topology change is completed.

An rbridge may generally move or migrate a VLAN in a non-base topology to a base topology, as mentioned above. When an rbridge obtains a frame that includes an extension, e.g., a fabric-path specific extension or a non-base topology extension, the rbridge may determine whether a VLAN on which the frame is to be forwarded is associated with a non-base topology and, thus, "interested" in the extension. If the VLAN is interested, the frame may be forwarded along with the extension, as it is effectively possible to configure features associated with the extension. If the VLAN is uninterested, the rbridge may move the VLAN to a base topology, and forward the frame after substantially excising the extension.

Figure 4:
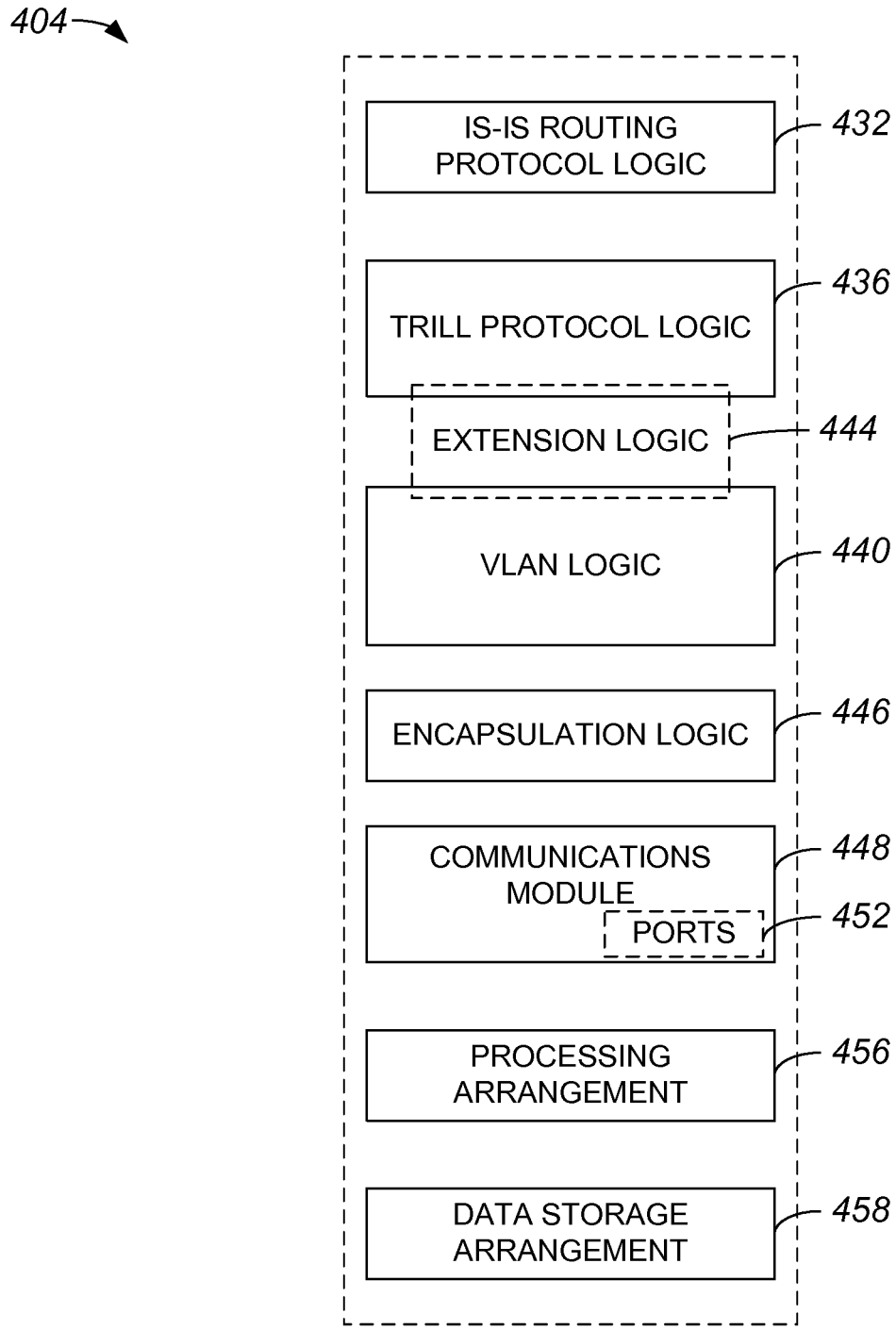
FIG. 4 is a block diagram representation of an rbridge in accordance with an embodiment.

Referring next to FIG. 4, an rbridge will be described in accordance with an embodiment. An rbridge 404 generally includes IS-IS routing protocol logic 432, or a module that supports an IS-IS routing protocol. IS-IS routing protocol logic 432 allows rbridge 404 to communicate with other rbridges (not shown), and implements extensions to establish efficient paths, e.g., shortest paths, across a Layer 2 topology. It should be appreciated that logic generally includes hardware logic and/or software logic, which is embodied on a tangible media such as a memory, that may be executed by a processing arrangement 456.

As shown, rbridge 404 also includes TRILL protocol logic 436 which provides functionality that allows routing on a Layer 2 network. TRILL protocol logic 436 is configured to identify loop free trees within a Layer 2 broadcast domain, as well as to encapsulate and forward Layer 2 Ethernet frames.

VLAN logic 440 is configured to enable rbridge 404 to create and/or enable a VLAN, or a broadcast domain. In addition to essentially allowing a VLAN to be configured, VLAN logic 440 allows rbridge 404 to effectively participate in one or more VLANs. It should be appreciated that rbridge 404 may be a part of more than one VLANs, e.g., a VLAN associated with a base topology and a VLAN associated with a non-base topology.

In the described embodiment, extension logic 444 cooperates with TRILL protocol logic 436 and VLAN logic 444 to allow extensions to be implemented with respect to a non-base, or enhanced, topology. For example, extension logic 444 may be arranged to configure a VLAN using specific extensions including, but not limited to including, fabric-path and vendor-specific extensions. Vendor-specific extensions may vary widely and may include, but are not limited to including, the ability to support multiple topologies, emulated switch/vpc+ functionality, optimized MAC address learning functionality, faster Spanning Tree Protocol (STP) and TRILL convergence, and the ability to notify a network of a MAC-address move. In general, extension logic 444 is arranged to support a non-base topology such that rbridge 404 may be included in a non-base topology. Extension logic 444 may also be arranged to move a particular VLAN from a non-base topology to a base topology within a mixed-vendor network such that the VLAN substantially maintains connectivity in the event that some transit rbridges (not shown) that carry the VLAN do not support the non-base topology. In one embodiment, extension logic 444 may compare a base topology broadcast graph and a non-base topology broadcast graph to determine whether a VLAN that from a non-base topology has been partitioned.

Encapsulation logic 446 is configured to encapsulate frames and to decapsulate encapsulated frames. In one embodiment, encapsulation logic 446 extends a TRILL header in a frame such that vendor-specific extensions may effectively be included in the frame. That is, encapsulation logic 446 may effectively create a frame that includes an extension.

A communications module 448 is configured to allow rbridge 404 to communicate within a network, and generally includes at ports 452. Ports 452 may be arranged to receive or otherwise obtain Layer 2 Ethernet frames, and to forward such frames once the frames are encapsulated by encapsulation logic 446.

A data storage arrangement 458 is arranged to include a TRILL forwarding database (not shown), and may store information that may be used by rbridge 404 to identify VLANs for which rbridge 404 is appointed as a forwarder. Data storage arrangement 458 may also store a list of VLANs that may be of interest to other rbridges (not shown), e.g., third party rbridges or rbridges from different vendors. It should be understood that broadcast graphs associated with an overall network topology may generally be stored in data storage arrangement 458.

Figure 5A:
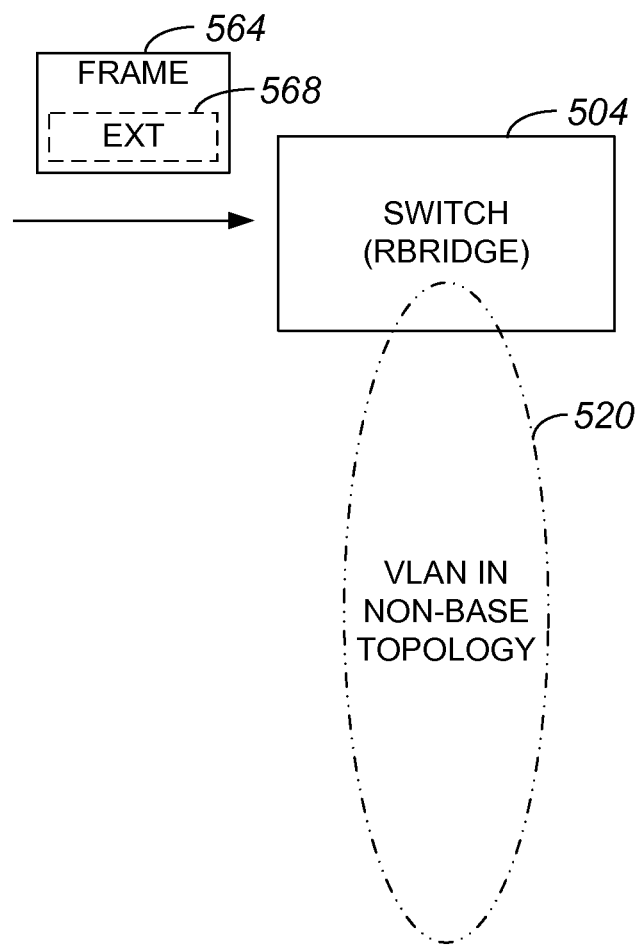
FIG. 5A is a diagrammatic representation of an rbridge receiving a frame with an extension in accordance with an embodiment.

When an rbridge that includes a VLAN associated with a non-base topology receives or otherwise obtains a frame, the rbridge ascertains whether the frame is associated with the non-base topology and, if not, may elect to move the VLAN to a base topology. FIG. 5A is a diagrammatic representation of an rbridge receiving a frame with an extension in accordance with an embodiment. An rbridge 504, which may be an ingress rbridge to an rbridge campus, obtains a frame 564 that includes an extension 668. Extension 668 may be a fabric-path specific extension or a vendor specific extension.

As shown, rbridge 504 is a forwarder for a VLAN 520. Thus, when rbridge 504 obtains frame 564, rbridge 504 may ascertain whether VLAN 520, which is associated with a non-base topology, is arranged to recognize extension 568.

Figure 5B:
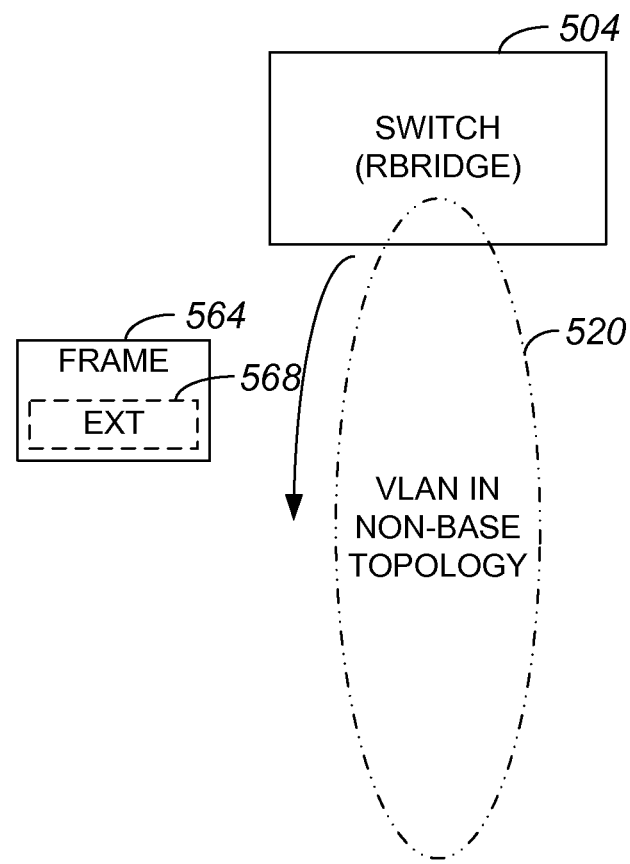
FIG. 5B is a diagrammatic representation of an rbridge, e.g., rbridge 504 of FIG. 5A, forwarding a frame, e.g., frame 564 of FIG. 5A, to an interested VLAN in accordance with an embodiment.

When rbridge 504 determines that VLAN 520 associated with a non-base topology recognizes extension 568, frame 564 is to be forwarded on VLAN 520, frame 564 may be forwarded such that extension 568 is included. FIG. 5B is a diagrammatic representation of rbridge 504 forwarding frame 564 with extension 568 contained therein. VLAN 520 is associated with a non-base topology that recognizes extension 568 and, therefore, is an interested VLAN that may correctly process or otherwise utilize information contained in extension 568. VLAN 520 may generally be considered to be an interested VLAN if substantially all nodes (not shown) included in VLAN 520 recognize extension 568.

Figure 5C:
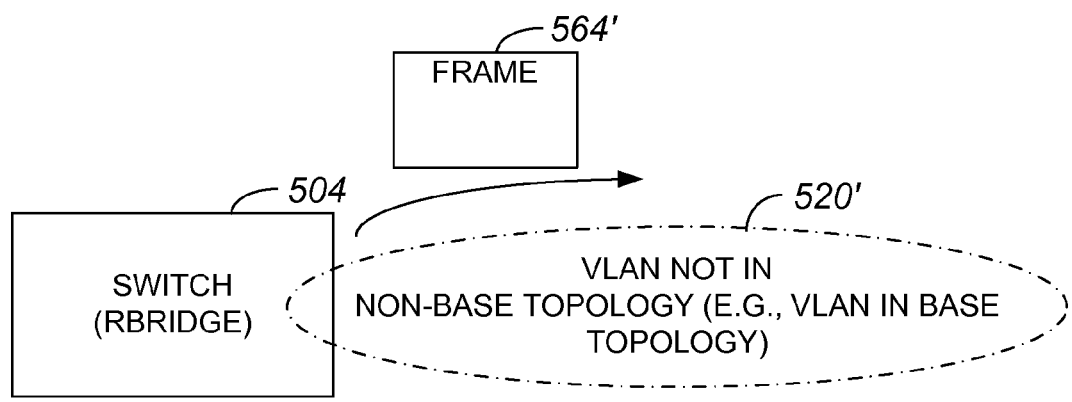
FIG. 5C is a diagrammatic representation of an rbridge, e.g., rbridge 504 of FIG. 5A, forwarding a frame, e.g., frame 564 of FIG. 5A, to an uninterested VLAN in accordance with an embodiment.

Alternatively, if rbridge 504 determines that extension 568 is not recognized by VLAN 520, VLAN 520 is considered to be uninterested. In one embodiment, VLAN 520 is considered to be uninterested if there is at least one node (not shown) associated with VLAN 520 that is not configured to recognize extension 568. Hence, as shown in FIG. 5C, rbridge 504 may move VLAN 520 to a base topology, as indicated by VLAN 520'. VLAN 520' is an uninterested VLAN, and frame 564' is forwarded by rbridge 504 to VLAN 520' such that extension 568 is not included in frame 564'.

Although only a few embodiments have been described in this disclosure, it should be understood that the disclosure may be embodied in many other specific forms without departing from the spirit or the scope of the present disclosure. By way of example, while switches have generally been described as being rbridges, switches are not limited to being rbridges. Any suitable switch may generally be configured to move a VLAN from a non-base topology to a base topology, as well as to determine whether a VLAN is an interested VLAN with respect to a received frame and to process the frame as appropriate based on whether the VLAN on which the frame is to be forwarded is interested or uninterested.

When an overall network includes nodes, e.g., rbridges, of different vendors, the network may include VLAN associated with different non-base topologies. That is, more than one non-base topology may be associated with a TRILL protocol. It should be understood that when a VLAN is identified as uninterested, the uninterested VLAN is not limited to being associated with a base topology. While an interested VLAN may be associated with a first non-base topology, an uninterested VLAN may be associated with either a base topology or a second non-base topology that is different from the first non-base topology.

A VLAN has generally been described as being substantially automatically moved from a non-base topology to a base topology. In lieu of being substantially automatically moved from a non-base topology to a base topology, a VLAN may be moved at the option of a user or a network administrator. That is, a network administrator may optionally move a VLAN from a non-base topology to a base topology if it is determined that basic connectivity is preferable even at the cost of losing features associated with an extension, e.g., fabric-path specific extensions and/or vendor specific extensions.

As will be appreciated by those skilled in the art, a Router Capability Time, Length, Value (TLV) may be encoded in a TRILL header, and may include an "Interested VLANs and Spanning Tree Roots sub-TLV." In a TRILL network, substantially every rbridge in "Interested VLANs and Spanning Tree Roots sub-TLV" lists VLANS for which the rbridge is an appointed forwarder on at least one port. From the "Interested VLANs and Spanning Tree Roots sub-TLV," a list of VLANs that certain TRILL rbridges are interested in may be identified.

The embodiments may be implemented as hardware and/or software logic embodied in a tangible medium that, when executed, is operable to perform the various methods and processes described above. That is, the logic may be embodied as physical arrangements or components. A tangible medium may be substantially any computer-readable medium that is capable of storing logic which may be executed, e.g., by a computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and/or transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
identifying a current topology associated with a virtual local area network (VLAN);
determining whether the current topology of the VLAN is to be moved to a base topology associated with a Transparent Interconnection of Lots of Links (TRILL) protocol; and
moving the current topology of the VLAN to the base topology if it is determined that the current topology of the VLAN is to be moved to the base topology, wherein when the current topology associated with the VLAN is identified as a non-base topology associated with the TRILL protocol, determining whether the current topology of the VLAN is to be moved to the base topology includes determining when the non-base topology has been partitioned, and wherein determining when the non-base topology has been partitioned includes obtaining a system-ID for at least one routing bridge (rbridge) associated with the non-base topology and determining when the system-ID is present in a broadcast graph of the base topology and missing from a broadcast graph of the non-base topology.

2. The method of claim 1 wherein identifying the current topology associated with the VLAN includes determining whether the current topology associated with the VLAN is a non-base topology associated with the TRILL protocol, wherein when the current topology associated with the VLAN is the non-base topology, it is determined that the current topology of the VLAN is to be moved to the base topology.

3. The method of claim 1 further including:
determining when a network topology has changed, wherein determining whether the current topology of the VLAN is to be moved to the base topology occurs when it is determined that the network topology has changed.

4. The method of claim 1 wherein when it is determined that the non-base topology has been partitioned, it is determined that the current topology of the VLAN is to be moved to the base topology.

5. The method of claim 1 wherein when it is determined that the system-ID is present in the broadcast graph of the base topology and missing from the broadcast graph of the non-base topology, it is determined that the non-base topology has been partitioned.

6. A tangible, non-transitory computer-readable medium comprising computer program code, the computer program code, when executed, configured to:
identify a current topology associated with a virtual local area network (VLAN);
determine whether the current topology of the VLAN is to be moved to a base topology associated with a Transparent Interconnection of Lots of Links (TRILL) protocol; and
move the current topology of the VLAN to the base topology if it is determined that the current topology of the VLAN is to be moved to the base topology, wherein when the current topology associated with the VLAN is identified as a non-base topology associated with the TRILL protocol, the computer code configured to determine whether the current topology of the VLAN is to be moved to the base topology includes computer code configured to determine when the non-base topology has been partitioned, and wherein the computer code configured to determine when the non-base topology has been partitioned includes computer code configured to obtain a system-ID for at least one routing bridge (rbridge) associated with the non-base topology and computer code configured to determine when the system-ID is present in a broadcast graph of the base topology and missing from a broadcast graph of the non-base topology.

7. The computer-readable medium of claim 6 wherein the computer program code configured to identify the current topology associated with the VLAN is further configured to determine whether the current topology associated with the VLAN is a non-base topology associated with the TRILL protocol, wherein when the current topology associated with the VLAN is the non-base topology, it is determined that the current topology of the VLAN is to be moved to the base topology.

8. The computer-readable medium of claim 6 wherein the computer program code is further configured to:
determine when a network topology has changed, wherein the computer program code configured to determine whether the current topology of the VLAN is to be moved to the base topology is configured to determine whether the current topology of the VLAN is to be moved to the base topology when it is determined that the network topology has changed.

9. The computer-readable medium of claim 6 wherein when it is determined that the non-base topology has been partitioned, it is determined that the current topology of the VLAN is to be moved to the base topology.

10. The computer-readable medium of claim 6 wherein when it is determined that the system-ID is present in the broadcast graph of the base topology but missing from the broadcast graph of the non-base topology, it is determined that the non-base topology has been partitioned.

11. An apparatus, the apparatus being a routing bridge (rbridge) arranged to be included in a Transparent Interconnection of Lots of Links (TRILL) network, comprising:
a processing arrangement; and
an extension arrangement, the extension arrangement being configured to cooperate with the processing arrangement to determine whether a virtual local area network (VLAN) of a non-base topology has been partitioned, the extension arrangement further being configured to move the VLAN to a base topology associated with TRILL protocol when it is determined that the VLAN of the non-base topology has been partitioned, wherein the extension arrangement is arranged to determine whether the VLAN of the non-base topology has been partitioned by determining when an identifier of a node in the VLAN of the non-base topology is indicated in a base topology broadcast graph and not indicated in a non-base topology broadcast graph, wherein it is determined that the VLAN of the non-base topology has been partitioned when it is determined that the identifier of the VLAN of the non-base topology is indicated in the base topology broadcast graph and not indicated in the non-base topology broadcast graph.

12. The apparatus of claim 11 wherein the extension arrangement is configured to cooperate with the processing arrangement to determine whether the VLAN of the non-base topology has been partitioned when a change is detected in the TRILL network.

13. The apparatus of claim 11 further comprising:
at least one port, the at least one port being configured to obtain at least one Layer 2 Ethernet frame; and
an encapsulation arrangement, the encapsulation logic being configured to encapsulate the frame.

14. A method comprising:
detecting a topology change associated with a virtual local area network (VLAN);
identifying a current topology associated with the VLAN after detecting the topology change;
determining whether the current topology of the VLAN is to be migrated to a base topology associated with a Transparent Interconnection of Lots of Links (TRILL) protocol after detecting the topology change, wherein the base topology is a standard Intermediate System-Intermediate System (IS-IS) topology; and
migrating the current topology of the VLAN to the base topology if it is determined that the current topology of the VLAN is to be migrated to the base topology.

15. The method of claim 14 wherein determining whether the current topology of the VLAN is to be migrated to the base topology includes determining whether the VLAN is partitioned.

16. The method of claim 14 wherein migrating the current topology of the VLAN to the base topology preserves connectivity with respect to the VLAN.

17. A tangible, non-transitory computer-readable medium comprising computer program code, the computer program code, when executed, configured to:
detect a topology change associated with a virtual local area network (VLAN);
identify a current topology associated with the VLAN after detecting the topology change;
determine whether the current topology of the VLAN is to be migrated to a base topology associated with a Transparent Interconnection of Lots of Links (TRILL) protocol after detecting the topology change, wherein the base topology is a standard Intermediate System-Intermediate System (IS-IS) topology; and
migrate the current topology of the VLAN to the base topology if it is determined that the current topology of the VLAN is to be migrated to the base topology.

18. The computer-readable medium of claim 17 wherein the computer program code configured to determine whether the current topology of the VLAN is to be migrated to the base topology includes computer program code configured to determine whether the VLAN is partitioned.

19. The computer-readable medium of claim 17 wherein the computer program code configured to migrate the current topology of the VLAN to the base topology is configured to preserve connectivity with respect to the VLAN.

* * * * *